(12) United States Patent
Ramakrishnan

(10) Patent No.: US 11,025,580 B2
(45) Date of Patent: Jun. 1, 2021

(54) METHOD, APPARATUS AND PRODUCT FOR DELIVERY OF ELECTRONIC MESSAGES TO ELECTRONICALLY UN-ADDRESSABLE ENTITIES

(71) Applicant: Arnexa, Inc., Mountain House, CA (US)

(72) Inventor: Sridhar Ramakrishnan, Mountain House, CA (US)

(73) Assignee: Arnexa, Inc., Mountain House, CA (US)

( * ) Notice: Subject to any disclaimer, the term of this patent is extended or adjusted under 35 U.S.C. 154(b) by 38 days.

(21) Appl. No.: 16/452,204

(22) Filed: Jun. 25, 2019

(65) Prior Publication Data

US 2020/0028817 A1    Jan. 23, 2020

Related U.S. Application Data

(60) Provisional application No. 62/701,201, filed on Jul. 20, 2018.

(51) Int. Cl.
*H04L 12/58* (2006.01)

(52) U.S. Cl.
CPC ............. *H04L 51/28* (2013.01); *H04L 51/00* (2013.01); *H04L 51/02* (2013.01); *H04L 51/04* (2013.01); *H04L 51/12* (2013.01); *H04L 51/14* (2013.01); *H04L 51/30* (2013.01)

(58) Field of Classification Search
CPC ......... H04L 51/12; H04L 51/14; H04L 51/28; H04L 51/30; H04L 61/00; H04L 61/30; H04L 12/58

USPC .......................................................... 709/206
See application file for complete search history.

(56) References Cited

U.S. PATENT DOCUMENTS

| | | | |
|---|---|---|---|
| 6,604,132 B1 * | 8/2003 | Hitt ...................... | G06Q 10/107 382/101 |
| 9,154,514 B1 * | 10/2015 | Prakash .................. | H04L 51/12 |
| 10,356,028 B2 * | 7/2019 | Valla ....................... | H04L 67/30 |
| 2001/0049745 A1 * | 12/2001 | Schoeffler ............... | H04L 51/30 709/238 |
| 2002/0002590 A1 * | 1/2002 | King ....................... | H04L 51/28 709/206 |
| 2002/0026487 A1 * | 2/2002 | Ogilvie ................... | H04L 51/18 709/206 |
| 2002/0029248 A1 * | 3/2002 | Cook .................. | G06Q 30/0601 709/206 |
| 2003/0107757 A1 * | 6/2003 | Gupton .................. | G06Q 10/10 358/1.15 |
| 2005/0010644 A1 * | 1/2005 | Brown .................... | H04L 51/30 709/206 |
| 2005/0021644 A1 * | 1/2005 | Hancock .............. | G06Q 10/107 709/206 |
| 2006/0059337 A1 * | 3/2006 | Poyhonen ........... | H04L 61/1511 713/165 |

(Continued)

*Primary Examiner* — James N Fiorillo
(74) *Attorney, Agent, or Firm* — Barry N. Young

(57) ABSTRACT

A system and method for enabling delivering to a receiver of a message addressed to a non-electronically addressable entity ID associated with the receiver employs a database storing a plurality of verified electronically addressable and non-electronically entity IDs associated with the receiver, and a controller that upon receiving a message addressed to non-electronically addressable entity ID identifies the receiver and enables the receiver access to the message.

17 Claims, 4 Drawing Sheets

(56) References Cited

U.S. PATENT DOCUMENTS

| | | | | |
|---|---|---|---|---|
| 2006/0168074 A1* | 7/2006 | Gardner | ................. | H04L 51/12 |
| | | | | 709/206 |
| 2006/0242247 A1* | 10/2006 | Richardson | ............ | G06Q 40/08 |
| | | | | 709/206 |
| 2007/0083306 A1* | 4/2007 | Comeau | ................. | G07C 5/008 |
| | | | | 701/29.6 |
| 2008/0141034 A1* | 6/2008 | Bartram | ................ | H04L 9/3239 |
| | | | | 713/176 |
| 2008/0221913 A1* | 9/2008 | Cook | ...................... | H04L 51/20 |
| | | | | 705/1.1 |
| 2009/0177484 A1* | 7/2009 | Davis | .................... | G06F 16/285 |
| | | | | 705/346 |
| 2012/0023196 A1* | 1/2012 | Grayson | ............ | H04L 29/1215 |
| | | | | 709/217 |
| 2012/0204032 A1* | 8/2012 | Wilkins | .............. | H04L 63/0428 |
| | | | | 713/170 |
| 2013/0312065 A1* | 11/2013 | Abeyweera | ............ | H04L 63/08 |
| | | | | 726/3 |
| 2014/0052799 A1* | 2/2014 | Keane | ..................... | H04L 51/28 |
| | | | | 709/206 |
| 2014/0189018 A1* | 7/2014 | Nawaz | .................. | G06Q 50/32 |
| | | | | 709/206 |
| 2014/0337439 A1* | 11/2014 | Baker | ..................... | H04L 51/02 |
| | | | | 709/206 |
| 2016/0043980 A1* | 2/2016 | Kalb | ....................... | G06Q 20/08 |
| | | | | 705/39 |
| 2016/0315969 A1* | 10/2016 | Goldstein | ............... | H04L 63/08 |
| 2020/0320410 A1* | 10/2020 | Herz | ..................... | G06N 20/00 |

* cited by examiner

METHOD, APPARATUS AND PRODUCT FOR DELIVERY OF ELECTRONIC MESSAGES TO ELECTRONICALLY UN-ADDRESSABLE ENTITIES

CROSS REFERENCE TO RELATED APPLICATIONS

This application claims the benefit of U.S. Application No. 62/701,201, filed Jul. 20, 2018, the disclosure of which is incorporated by reference herein.

BACKGROUND

Today electronic messages can be delivered to "electronically" addressable entities (i.e., email messages to email addresses, Short Service Messages (SMS) to cell phones, in-app messages to user ID's in various apps such as Skype, WhatsApp, etc., to name a few). Likewise, physical letters (otherwise called "snail mail" messages) can be delivered to physical postal addresses.

It is also not possible today to deliver electronic messages to physical postal addresses. Nor is it possible to deliver messages (electronically or otherwise) to hitherto un-addressable entities such as, for example, tax-payer identification numbers (TINs), Social Security Numbers (SSNs), credit card numbers, bank account numbers, vehicle registration identification numbers, or vehicle identification numbers (VINs), to name a few.

A sender may not always know an electronic address, such as an email address, of a receiver to which it may wish to send a message electronically, although it may know one or more non-electronic addresses or un-addressable identifiers associated with the receiver. In such instances, the sender may have no recourse other than to attempt a physical delivery of the message to the receiver. This may be inconvenient, impractical, or untimely to meet a deadline.

It is desirable to provide a system and method that addresses this problem by enabling electronic messages to be addressed and delivered electronically in a secure, and verified manner to physical addresses, such as postal addresses, and to otherwise non-addressable entities such as tax payer identification numbers, bank/credit account numbers, vehicle identification numbers, etc. It is to these ends that this invention is directed.

SUMMARY OF THE INVENTION

This invention affords a system and a method that enable senders to send messages electronically to a receiver for which the senders may have no electronic address for the receiver. In an embodiment this may be accomplished by sending an electronic message to the receiver via a service provider ("SP") which is configured in accordance with the invention to store one or more addresses of entities associated with the receiver, identify the receiver from an address in the received message, determine one or more addresses associated with the intended receiver and route the message to the receiver using the one or more associated addresses. To facilitate this, senders, service providers and receivers may utilize a system and a software process in accordance with the invention to receive, process and send messages electronically to message receivers.

DETAILED DESCRIPTION OF PREFERRED EMBODIMENTS

High Level Overview

As will be described, the invention affords a system and process that enables a user (also called a receiver in this document) to associate multiple addresses (called entity IDs in this document) with a user/receiver. Entity IDs may be electronic addresses, such as email addresses or mobile telephone numbers, and non-electronic addresses such as home addresses, phone numbers, passport IDs, etc., to which electronic messages intended for the receiver may be addressed. Entity IDs corresponding to addresses may be associated with particular receivers after verification. Senders can send electronic messages to receivers by choosing one or more entity IDs associated with a receiver. Senders may also specify security criteria that must be adhered to in order for their messages to be viewed by the receivers.

In one aspect the invention may operate as follows: Message receivers (also, interchangeably, called "users" herein) may register entities they are associated with in an entity vault database. The entity vault database, which may be a relational database, may be maintained by the service provider. The entities may include electronically addressable entities such as email addresses, mobile phone numbers, etc., and may also include non-electronically addressable entities such as physical postal addresses, and un-addressable entities such as taxpayer identification numbers, etc. Each entity added by the user into the vault may be verified upon addition using various different mechanisms for different types of entities.

Message senders can send electronic messages to message receivers using software that is compatible with a protocol defined in accordance with this invention. Senders may specify the message content, including attachments of digitized files to the message, and send messages to one or more entities convenient for the sender with which receivers are identified, and may specify security parameters, if any, governing message delivery.

The system may look up specified entities in the entity vault database, and identify one or more receivers to which the message should be delivered. If a receiver meets the security criteria specified by the message sender for message delivery, the receiver will be able to access the message electronically in a system-provided application (using, for example, a mobile application, a desktop application, or other applications on other devices).

Figure 1:
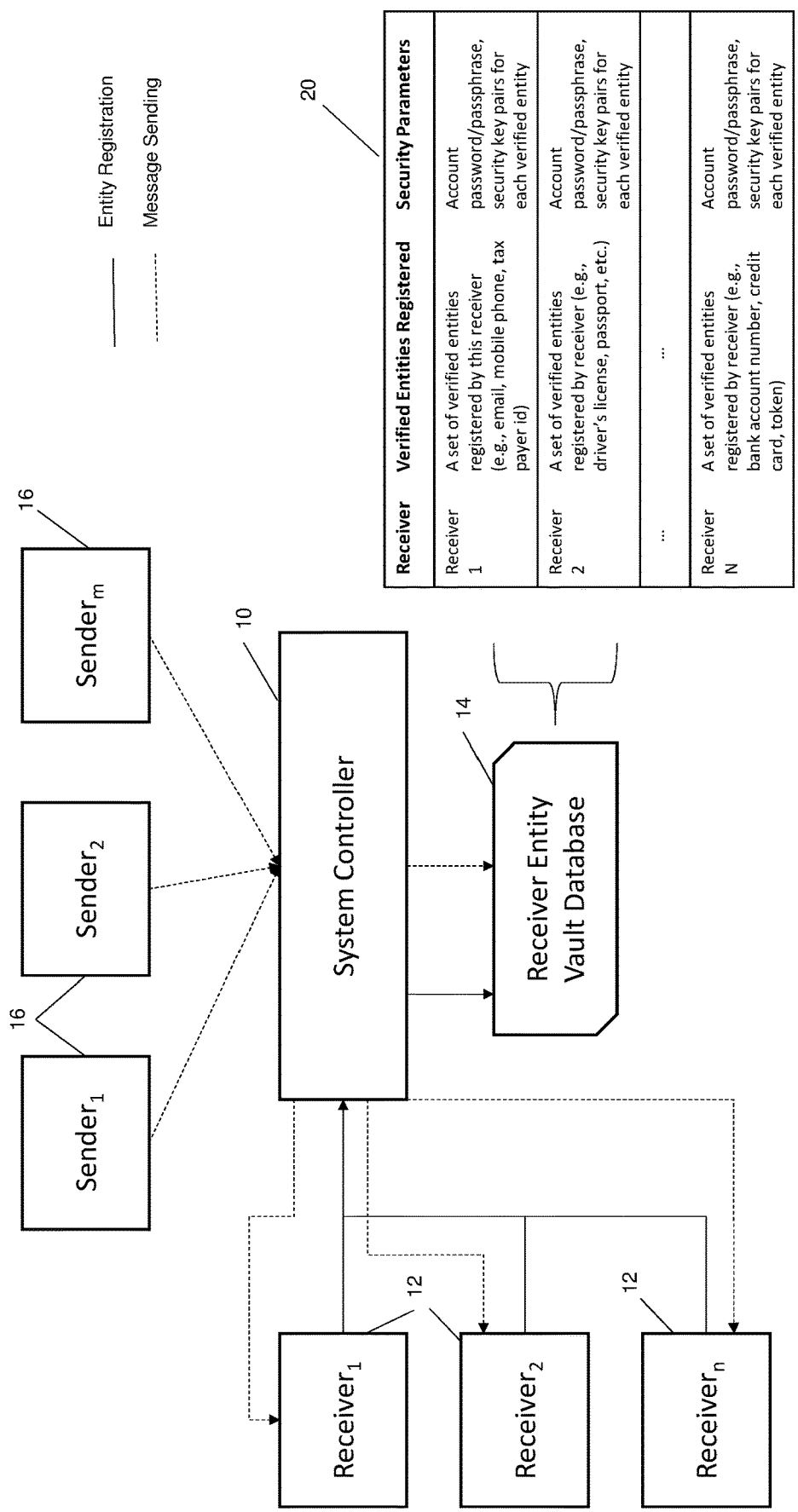
FIG. 1 is a diagram illustrating the architecture of a system in accordance with the invention for managing delivery of electronic messages, and illustrates how the components cooperate together.

FIG. 1 is an example of an embodiment of a system in accordance with the invention where a system controller 10 connects with a plurality of n receivers 12 having associated entity IDs stored after verification in an entity vault database 14, such as a relational database, and may connect with a plurality of m senders 16. The system controller may comprise a processor and memory embodying executable instructions for performing a method as described herein, and along with the entity vault database may comprise a service provider providing electronic messaging services. The system of FIG. 1 enables one or more senders 14 to send electronic messages to one or more receivers 12 by addressing the messages to one or more of a receiver's entity IDs, including, as will be described, entity IDs which are otherwise not capable of being addressed electronically.

The system of FIG. 1 may comprise several components that perform different functions. These may include, in the embodiment shown, receivers 12 that create/update entity IDs (such as, for example, their email addresses, home addresses, card/bank accounts, tax payer ids, etc.) associated with the receivers. In addition, receivers may also create security parameters which may include a security passphrase and also account passwords. Cryptographic key pairs may be associated with each verified entity ID and may be used to decrypt messages or verify cryptographic signatures as the case may be. Each receiver is responsible for carefully safeguarding its password, security passphrase and private keys.

Figure 2:
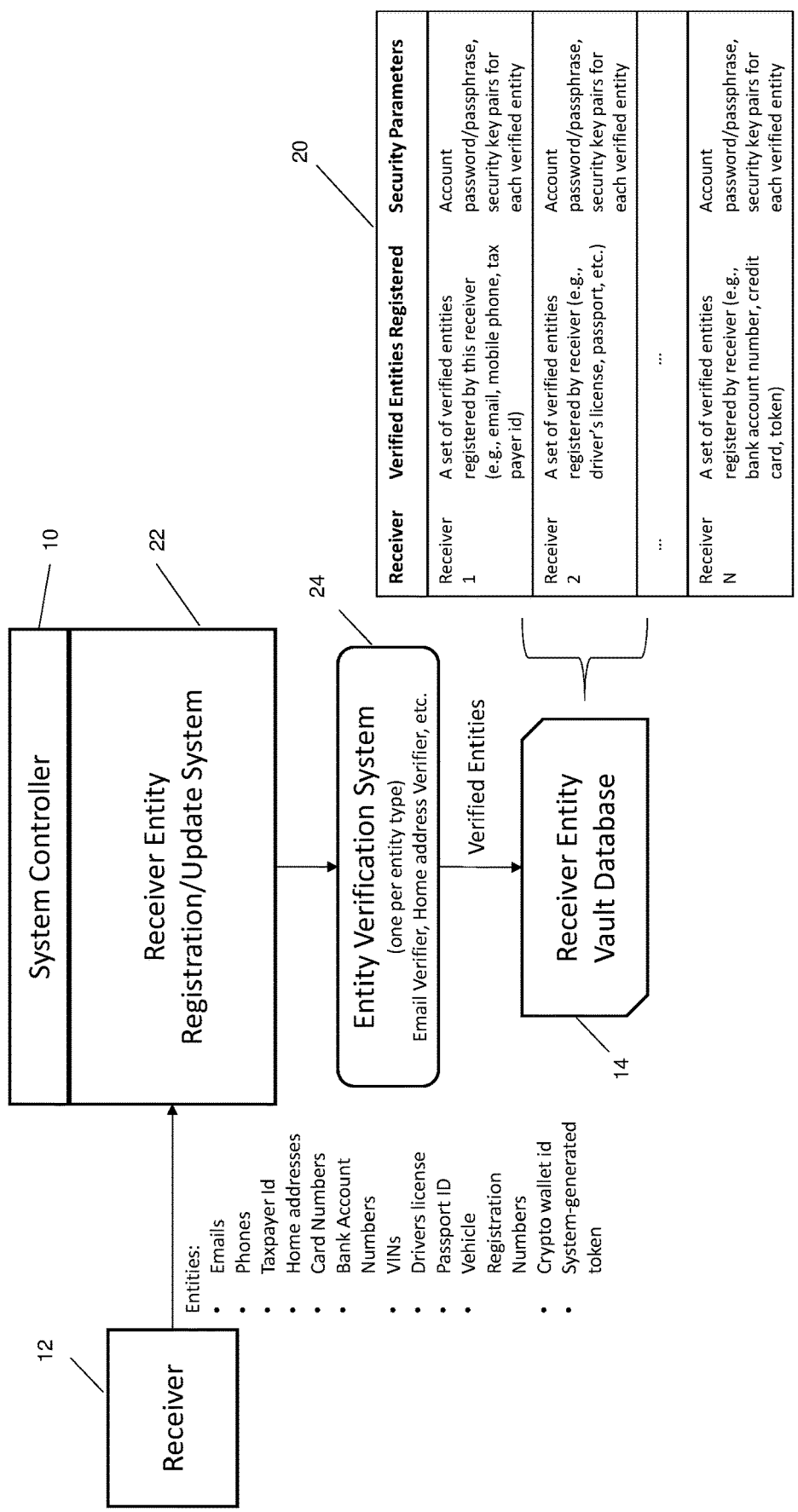
FIG. 2 illustrates an embodiment of a process flow and components of a receiver entity ID creation/update process according to the invention.
Figure 3:
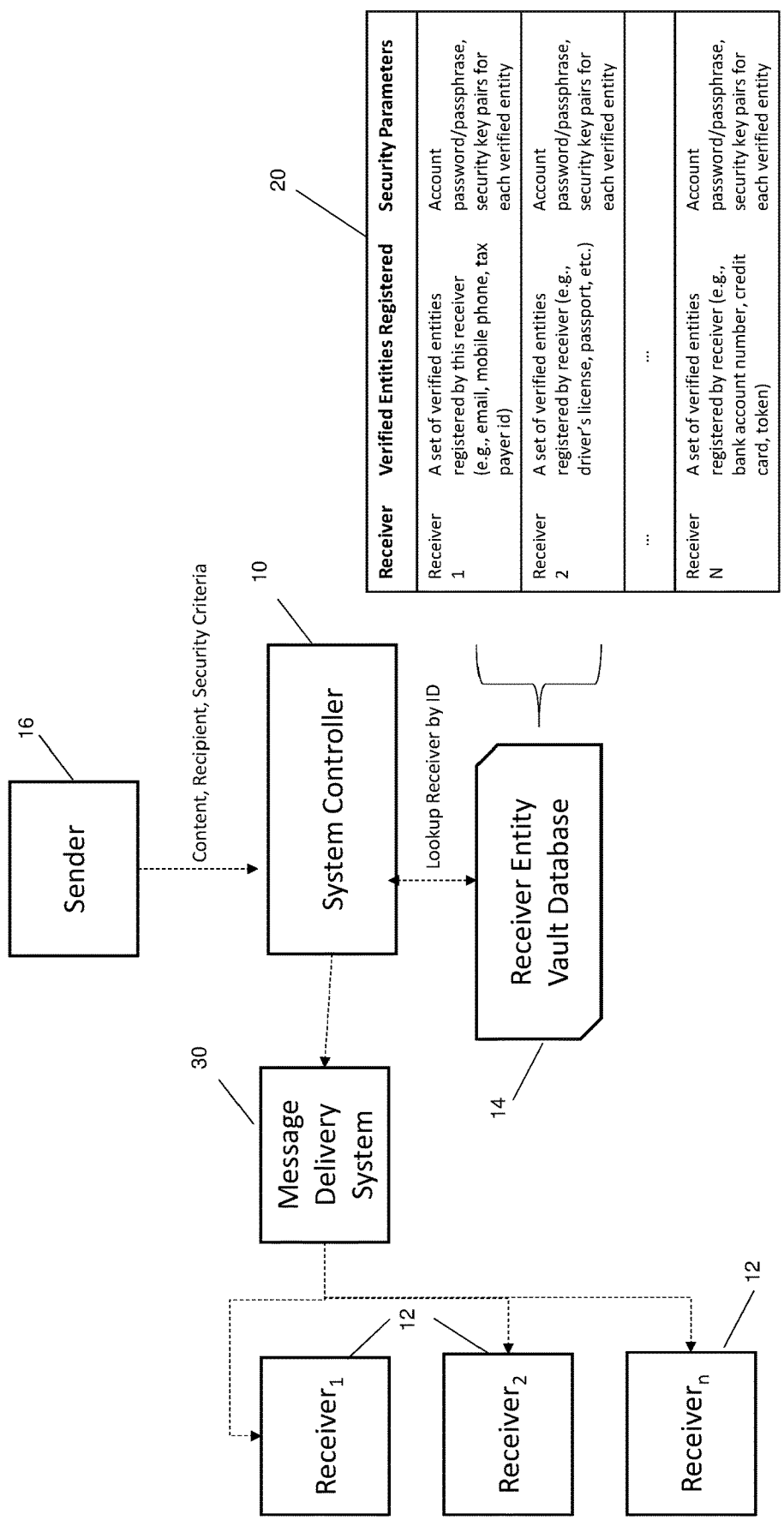
FIG. 3 illustrates an embodiment of a message sending process according to the invention, showing how sender messages are routed to the appropriate receivers based on the sender's criteria.

Additionally, each entity ID that is associated with a receiver may be verified by an entity verification system, an embodiment of which is shown and described in connection with FIG. 2. Verified entity IDs of a receiver 12 may be stored in the receiver entity vault database 14, which may be a relational database, and associated with that receiver. FIG. 3 illustrates an embodiment of a message sending process. The processes of FIGS. 2 and 3 illustrate examples 20 of verified entities and security parameters. The processes may operate together to send messages, as will be described.

Senders may communicate electronic messages to receivers using particular predetermined criteria. Considering a sender process, the system and method may comprise different components and functions. These may include, for example, the following. Senders who desire to send messages to receivers may specify the message criteria, such as message content, the receivers (by entity ID) and security criteria, if any, that the receivers must meet to access the message. The receiver criteria may be used by the system controller to identify a set of one or more users/receivers to which messages are to be delivered. Once a receiver/user has been notified of a message by a message delivery system, access to the message by the receiver/user is controlled by the security criteria specified by the sender, examples of which are described below. Receivers who do not meet the security criteria may not be given access to the message. FIG. 1 illustrates examples of some receiver criteria and parameters 20 that may be used.

Receiver Entity ID Registration and Verification

FIG. 2 illustrates an embodiment of a receiver entity ID registration and verification process and system according to the invention. A receiver entity registration/update system comprising executable instructions running on the processor of the system controller 10 may handle entity ID creation and updates for the receivers. Receivers may add and/or update, and verify their entity IDs. Each such entity ID is processed by an entity verification system 24 which may perform a variety of different custom verification processes (verifiers) that may vary and be dependent on the type of entity ID. Thus, for example, physical (e.g., postal) addresses may be verified by a physical address verifier, as will be described. A receiver may have many different entity IDs associated with it. Each entity ID type may have one or more verifiers associated with it for verifying the entity ID's association with the receiver.

The addressability of entities, as used herein, may be defined as follows: (1.) electronically addressable: An entity is electronically addressable if the receiver can receive electronically messages addressed to that entity; and (2.) not electronically addressable: This includes all other entities which cannot receive electronic messages addressed to them, e.g., postal address, or bank account or credit card numbers. Such entities cannot receive electronic messages today.

The following table shows a list of possible entity IDs and their associated verifiers (there may be many others) which the invention may employ:

| Entity ID Type | Electronically Addressable? | Verification Process |
| --- | --- | --- |
| Email Address | Yes | Verification code may be sent to specified email address. Receiver must enter verification code to verify said address. |
| Mobile Phone Number | Yes | Verification code may be sent via Short Message Service (SMS). Receiver must enter verification code to verify said phone number. |
| Land Line Phone Number | No | Verification code may be sent via voice call to a receiver. Receiver must enter verification code to verify said phone number. |
| Physical Postal Address | No | Three verification processes for physical addresses (among others not listed) may be used: Process 1: Verification code may be sent via a physical letter delivered by appropriate postal/courier service to specified physical address. Receiver enters code upon receipt of letter to verify said address. Process 2: GPS location of a mobile phone matches the geocoded location of specified address. Process 3: Peer-to-peer delivery of electronic code. In this case, a "nearby" receiver - called a "neighbor" or "peer" may receive an encrypted code electronically on behalf of an intended receiver. The "neighbor" then delivers the encrypted code either physically or via paired Bluetooth connection to mobile device to intended |

-continued

| Entity ID Type | Electronically Addressable? | Verification Process |
|---|---|---|
| | | receiver, which decrypts (with its private key) the code to obtain the actual verification code. Receiver enters code upon decryption to verify said address. |
| Financial Entity IDs (credit card, bank account ids, crypto-currency wallet ID) | No | Standard account verification mechanisms may be used whereby users are asked to provide account information details (known only to an authorized owner of the account) such as account balance, or specific transaction details (amounts, etc.). Only upon providing the correct information is the account number considered to be verified. |
| Tax Payer ID (Social Security Number, etc.) | No | A receiver uploads digitized social security or tax payer ID cards. A verification algorithm on the uploaded card, along with other system checks, may be performed to validate that the card belongs to this receiver. |
| Vehicle Identification Number (VIN) | No | Receiver plugs into a system-provided device such as an OBD scanner or the like having an app to an "on-board diagnostics" (OBD) port of the user's vehicle. System-provided app reads the VIN and approves or rejects specified value. |
| Driver's License ID, Passport ID | No | Receiver uploads digitized image of user's driver's license or passport or other government issued photo ID. A verification algorithm on the uploaded file, along with other checks, may be performed to validate that this document belongs to this user/receiver. |
| System-generated token ID | No | The system generates unique tokens - at the request of the receiver. Tokens may be unique alphanumeric strings. No additional verification is necessary because these tokens are generated by the system for authenticated receivers only. Receivers can affix/attach/stick such tokens to physical goods (like passports, physical key chains, etc.) |

As shown in the table above, each entity ID that the receiver adds for addressing purposes is subject to a verification process (outlined in the third column). Once an entity ID is verified and associated with a user, it then becomes an "addressable" entity ID to which senders can direct messages that may be received by receivers with appropriate software application. Preferred verifiers and their operations are described below.

Physical Address Verification or Enforcement Via GPS Geocoding Match

A receiver's physical address must be verified as an authenticated address belonging to the receiver. This may be done during the Entity ID verification step, an example of which is as follows. When a receiver receives a message, if the sender has specified geographic constraints, for example, the system may verify that the receiver is at the specified physical geographical location before allowing the receiver/user to view the message. This may be done, for instance, in a system-provided mobile application that may operate as follows. Assuming A is the physical address of a receiver that must be verified or enforced, a GPS location (G) of the receiver's mobile device may be obtained. Next, the physical address A may be geocoded to yield latitude/longitude coordinates G', and G and G' may be compared. If G matches G' the physical address can be verified as valid.

Physical Address Verification Via Peer-to-Peer Code Delivery

Another approach is to verify a physical address by a "peer-to-peer" approach. The following are exemplary steps that may be taken. Assuming A is the physical address that must be verified for a receiver R. The system may identify "nearby" receivers who have been previously authenticated users in the system. One or more of the nearby receivers may be sent an electronic message with an encrypted code, e.g., a number, intended for R. The encrypted code may be created, for example, by encrypting the number using a public key for R. One or more of the nearby receivers may physically deliver the encrypted code to R at the physical address A as a physical representation the encrypted code. Alternatively, the code may be transmitted via a paired Bluetooth connection from the neighbor's mobile device to R's mobile device.

Tax Payer ID Verification

A tax payer ID, such as a Social Security Number, or a Taxpayer Identification Number, may be verified as follows. A user/receiver may upload an image of the user's government-issued tax payer document and use the image for validation. In addition, for validating the uploaded image, the system may query third party services such as credit bureaus to form a set of challenge questions that would be known only to the user, such as certain account ownership information, previous residence addresses, etc. The receiver would have to successfully respond to the challenge questions to establish that it is indeed the true owner of the specified tax-payer ID.

Vehicle Identification Number (VIN) Verification

A VIN number associated with a user/receiver may be verified as follows. A receiver may enter a VIN number to be verified. The receiver may then connect an OBD ("On Board Diagnostics") system-provided mobile scanner device having an embedded application to the vehicle. The application may then read the VIN number and upload it directly from the OBD scanner to the system. The system can read and verify that the uploaded VIN number from the scanner is the same as that entered by the user/receiver.

Driver's License, Passport ID or Government-Issued Photo ID Verification

Government issued photo ID's may be verified as follows. A user/receiver may upload a recent photo of the receiver/user to system. The receiver then may upload one or more images of relevant pages of its government-issued photo ID's. The uploaded images may be compared by the system for a match with the uploaded photo. If the match is ambiguous (e.g., photos are old, etc.), human intervention may be applied and verification may be done manually by the system provider. If they are available, third-party systems provided by governments may be queried to validate the information provided.

Sender Verification Process

In an embodiment, senders may also be verified, as when they register with the system. During an on-boarding registration process, a sender's email address, domain name (if any) and phone number (if any) may be verified by standard means. Two senders cannot have the same email address, domain name or phone number. Messages sent by a sender may be displayed along with message envelop metadata or other information which comprises email address, domain name and/or phone. Business senders may be required to have domain and phone numbers registered, and possibly may provide business registration documents for review and approval.

Senders, at their option, may specify Internet Protocol (IP) addresses from which their messages originate as an additional check on the authenticity of messages sent. This is valuable, for example, for financial institutions, or government agencies (such as taxing authorities) because it is very important for receivers to trust the authenticity of the sender. Where such additional IP address constraints are used, the system may enforce message authenticity by ensuring that such requests originate from the specified IP addresses.

Sender Message Sending Process

FIG. 3 illustrates an embodiment of a message sending process in accordance with the invention. A sender 16 may send messages to one or more receivers 12 within the system via the system controller 10 and a message delivery system 30 which delivers the messages to the intended receivers. To do this, the sender 16 sends messages to the system controller which specify message parameters and criteria, such as message content, receiver information and security criteria (if any). Upon verification of the receiver entity IDs in the messages using the receiver entity vault database, the system controller may send the messages to the message delivery system 30 for delivery to the intended receivers/users in accordance with the message parameters and criteria. The following are examples of parameters and criteria.

Message content can be a plain-text digital file, or it can be in Portable Document Format (PDF), or it may be digitized image files in a standard image format. Receiver information supplied for a receiver may comprise one or more entity IDs as a message address. If multiple IDs are provided, then, in an embodiment, all entity IDs supplied must match in order to send a receiver the message. Examples of entity IDs may include the following, among others:

a) "123 Any Street, Anytown, NY 12345";
b) "ABA:021000021:123456789"—bank account at J P Morgan Chase NA identified by its ABA routing number.
c) "1234567891234567"—credit card number.
d) "123 One More Ave., PA 01234" and "212-555-1212". Two entity IDs are specified here—a physical address and a telephone number. In an embodiment, both entity IDs must match the receiver's verified entity IDs in order to successfully identify the receiver. In another embodiment, fewer than all entity IDs must match,
e) An entity ID may be a system-generated token ID such as "ABC123456789" for example.
f) Alternately, the sender can also specify "wild-card" parameters such as "All receivers in a particular postal code."

Security criteria that may be specified may include, for example whether the message may only be viewed by the receiver at (one of) their registered physical address. For example, a bank may be interested in notifying users of important account changes (such as the addition/deletion of beneficiaries) but specify that such messages must be viewed by the named user/receiver at the home address only. Other security criteria may be whether the receiver should be required to decrypt the message with the receiver's private key; whether the message is ephemeral, and, if so, how many seconds after viewing or sending will it be automatically deleted; and verifier text comprising a shared secret between sender and receiver/user may also be used. Thus, for example, if the user spent $12.60 using a credit card, verifier text could be a message from a credit card sender with a verifier text such as "Confirm that you spent $12.60 on May 1, 2019 using card ending in x1234." Only if the user recognizes the verifier text and assents to the actual message content (assuming all other checks have passed successfully) is the user verified.

Receiver Identification Process

Figure 4:
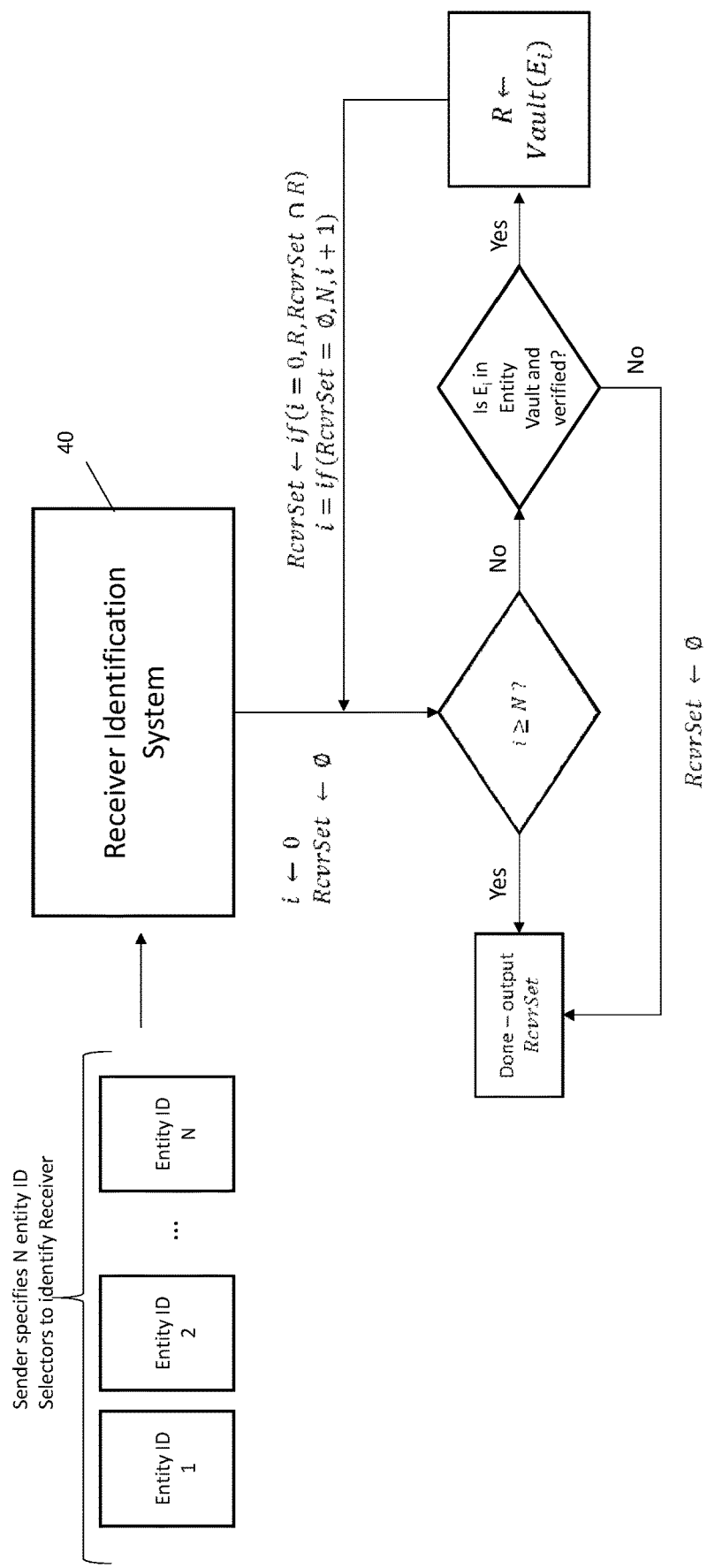
FIG. 4 is a detailed flow-chart of a process according to the invention illustrating an embodiment of how receivers may be identified using one or more entity IDs.

FIG. 4 is an example of an embodiment of a receiver identification system flow and logic process 40 in accordance with the invention. Upon receiving a message from a sender, the system may first validate the sender, and then look through the entity vault database 14 for receivers that match one or more receiver entity IDs specified by the sender. If multiple entity IDs are provided by the sender, then, as noted above in accordance with an embodiment, all entity IDs may be required to match in order to identify a receiver and validate the sender. If an appropriate entity ID is found, it must be one that has been verified. The system may be configured to not deliver messages to unverified entity IDs or from un-validated senders.

The receiver identification process of FIG. 4 checks, in turn, each of one or more entity IDs supplied by the sender of a message, and uses the results to identify the receiver for delivery of the associated message. In an embodiment, the process may be used to validate the sender of the message by requiring the sender to specify multiple entity IDs of the intended recipient that the system can confirm as being associated with the receiver.

An advantage of requiring senders to use multiple entity IDs to select a recipient and validate a sender is that this may be used to eliminate phishing and SPAM messages. Phishing messages are those wherein scammers mimic the appearance of legitimate messages from legitimate senders in order to trick the recipient to take an action that leads to them being defrauded, and SPAM messages are unwanted solicitations. Legitimate senders will likely know more information about the user/recipient to which their messages are addressed that was gathered in the normal course of commerce or interaction with the user, and, therefore, will know more than one entity ID associated with the user. For example, a bank will know about the various accounts belonging to their customer at that bank, and other information such as the customer's email address, phone number, tax payer ID number, etc. Fraudsters, by contrast, will likely not know multiple entity IDs associated with a user. Thus, while a legitimate sender can likely specify multiple entity IDs that must match to identify a recipient, a fraudster will likely specify only one entity ID to identify a recipient. By requiring legitimate senders to specify multiple entity IDs when they send messages, the system may easily validate the sender and classify as "junk" and avoid sending messages that specify only a single entity ID. Alternatively, the system may hold such messages in a "junk" folder, alert the receiver to their presence, and delete the messages after a selected period of time.

Message Delivery Process

Once a receiver has been identified, the receiver may be sent a notification from a message delivery system 30 to the receiver to access the message. Messages may be accessed by the receiver in a system-provided mobile application, for example, or using other suitable devices and applications such email clients, web browsers, etc.

Messages having geographic constraints may only be viewable using supported applications on devices that are enabled with GPS location services, i.e., such devices need to be equipped to connect to networks so that their GPS location can be determined. To enforce this constraint the user/receiver viewing device may transmit (via location services) its GPS location, and the sender must have specified a receiver entity ID physical address having geocoding that matches the specified GPS location.

Non-geographically constrained messages or messages for which no additional security criteria are specified may be viewed using applications on computers or other devices that do not have geographic location capability.

If the message has geographic constraints attached as part of the security criteria imposed by the sender, e.g., the message must be viewed at a registered physical address. The user may be notified of this and asked to view the message via a provided mobile application while at the specified physical location. If the content of the message has been encrypted, the user will be asked to enter a secure passphrase and/or appropriate private key(s) to decrypt the message contents.

Finally, the message delivery system may also enforce any post-message viewing or delivery constraints. For example, messages may be ephemeral and deleted following viewing or delivery after a predetermined number of seconds have elapsed.

The foregoing description has been with reference to particular embodiments of the invention. It will be appreciated, however, that these embodiments are merely examples illustrating the invention and that changes to these embodiments may be made with departing from the spirit and principles of the invention.

The invention claimed is:

1. A method of delivering an electronic message to a receiver having as an address a non-electronically addressable entity ID, comprising:
   registering said non-addressable entity ID and a plurality of other non-electronically addressable entity IDs as corresponding to entities that are associated with the receiver;
   verifying, upon said registering, that the non-addressable entity ID and said plurality of other non-electronically addressable entity IDs identify the receiver;
   receiving from a sender an electronic message that is addressed to said non-electronically addressable entity ID, the message having associated security criteria requiring compliance for accessing the message;
   enabling the receiver to access the message upon confirming that the non-addressable entity ID of said message identifies the receiver and that the receiver has complied with said security criteria; and
   validating the sender of the message as being legitimate by determining that said sender also addressed the message to multiple other ones of said plurality of non-electronically addressable entity IDs that are valid and identify the receiver.

2. The method of claim 1, wherein there are a plurality of electronically addressable and non-electronically addressable entity IDs associated with the receiver, and wherein said enabling the receiver to access the message comprises sending the message to an electronically addressable entity ID associated with the receiver.

3. The method of claim 2 further comprising associating said plurality of other non-electronically addressable entity IDs with said receiver in a database.

4. The method of claim 1, wherein said message is addressed to a non-electronically addressable entity ID having an associated geocoded geographical location, and said enabling access comprises requiring a physical location of an accessing device of the receiver to match said geocoded geographical location.

5. The method of claim 1, wherein said security criteria comprise an encrypted code in the message, and said enabling requires the receiver to decrypt the encrypted code to access the message.

6. The method of claim 1, wherein said non-electronically addressable entity ID comprises a physical address, and said confirming comprises receiving from the receiver a verification code that was physically delivered to the receiver.

7. The method of claim 1, wherein said non-electronically addressable entity ID to which said electronic message is addressed comprises a vehicle identification number (VIN) of a vehicle registered to said receiver, and said method comprises receiving from the receiver a VIN scanned from said vehicle by an on-board diagnostics scanner.

8. The method of claim 1, wherein said verifying said non-electronically addressable entity ID is associated with the receiver comprises peer-to-peer verification.

9. The method of claim 1, wherein said verifying further comprises verifying that said sender of said message is an authorized sender.

10. The method of claim 1, wherein said enabling the receiver to access to the message further comprises enforcing post access constraints on said receiver, said post access constraints comprising automatically deleting said message a predetermined time following access by said receiver or sending by said sender.

11. Non-transitory computer readable storage media embodying instructions for controlling a processor to perform a method of delivering an electronic message to a receiver having as an address a non-electronically addressable entity ID, comprising:
registering said non-addressable entity ID and a plurality of other non-electronically addressable entity IDs as corresponding to entities that are associated with the receiver;
verifying, upon said registering, that the non-electronically addressable entity ID and said plurality of other non-electronically addressable entity IDs uniquely identify the receiver;
receiving from a sender an electronic message that is addressed to said non-electronically addressable entity ID, the message having associated security criteria requiring compliance for accessing the message;
enabling the receiver to access the message upon confirming that the non-electronically addressable entity ID of said message identifies the receiver and that the receiver has complied with said security criteria; and
validating the sender of the message as being legitimate by determining that said sender also addressed the message to multiple other ones of said plurality of non-electronically addressable entity IDs that are valid and identify the receiver.

12. The non-transitory computer readable storage media of claim 11, wherein there are a plurality of electronically addressable and non-electronically addressable entity IDs associated with the receiver, and wherein said enabling the receiver to access the message comprises sending the message to an electronically addressable entity ID associated with the receiver.

13. The non-transitory computer readable storage media of claim 11, wherein said message is addressed to an entity ID having an associated geocoded geographical location, and said enabling access comprises requiring a physical location of a device of the receiver to match said geocoded geographical location.

14. The non-transitory computer readable storage media of claim 11, wherein said security criteria comprise an encrypted code in the message, and said enabling requires the receiver to decrypt the encrypted code to access the message.

15. The non-transitory computer readable storage claim 11, wherein said verifying further comprises verifying that said sender of said message is an authorized sender.

16. A system for delivering electronic messages to a non-electronically addressable entity ID associated with a receiver, comprising:
a system controller comprising a processor and a memory embodying executable instructions for controlling the processor; and
a receiver entity database interfaced to said system controller storing verified entity IDs associated with a plurality of receivers interfaced to said system controller, said verified entity IDs comprising, for each receiver, one or more non-electronically addressable entity IDs and a plurality of other non-electronically addressable entity IDs that identify the receiver;
said processor being configured to receive a message from a sender addressed to a non-electronically addressable entity ID associated with said receiver, confirm the identity of said receiver, determine from said database an electronically addressable entity ID associated with said receiver, deliver said message to said receiver using said electronically addressable entity ID, and validate the sender of the message as being legitimate by determining that said sender also addressed the message to multiple ones of said other non-electronically addressable entity IDs that identify the receiver.

17. The system of claim 16, wherein said system controller comprises a service provider interfaced to a plurality of senders sending electronic messages to said plurality of receivers, said system controller enforcing security constraints established by a sender of said message before enabling the receiver to access said message.

* * * * *